United States Patent [19]

Kellermyer

[11] Patent Number: 4,544,173

[45] Date of Patent: Oct. 1, 1985

[54] SELF-STORING LPG TANK CART

[76] Inventor: David S. Kellermyer, 919 Wilhelm, Defiance, Ohio 43512

[21] Appl. No.: 563,179

[22] Filed: Dec. 19, 1983

[51] Int. Cl.$^4$ .............................. B62B 3/10; B62B 1/26
[52] U.S. Cl. .............................. 280/47.33; 280/79.1 A; 248/129
[58] Field of Search ............... 280/47.13 R, 63, 47.33, 280/79.1 A; 248/129; 220/69, 85 P, 85 R

[56] References Cited

U.S. PATENT DOCUMENTS

| | | | |
|---|---|---|---|
| 266,655 | 10/1882 | Stewart | 248/129 |
| 1,744,414 | 1/1930 | Pflaum | 280/47.33 |
| 2,917,769 | 12/1959 | Kasper | 280/79.1 A |
| 4,356,988 | 11/1982 | McIntosh | 248/129 |
| 4,358,137 | 10/1982 | Gramm | 280/47.13 R |

Primary Examiner—Joseph F. Peters, Jr.
Assistant Examiner—Everett G. Diederiks, Jr.
Attorney, Agent, or Firm—Harvey B. Jacobson

[57] ABSTRACT

A support frame in the form of a rigid cylindrical ring of a diameter for snugly receiving either shouldered diametrically reduced base or valve shielding end of an LPG (propane) tank is provided and the ring includes a support leg carried by a first peripheral portion of the ring and projecting generally axially of one axial end of the ring. A pair of support arms are supported from second and third peripherally spaced portions of the ring substantially equally oppositely angularly spaced from the first ring peripheral portion and spaced slightly on the side of a diametric plane of the ring remote from the first portion and disposed normal to a radial plane of the ring upon which the leg is disposed. The arms also project generally axially outwardly from the aforementioned one axial end of the ring and the outer free ends of the arms include support wheels journalled therefrom for rotation about generally aligned axes parallelling the aforementioned diametric plane.

3 Claims, 4 Drawing Figures

SELF-STORING LPG TANK CART

BACKGROUND OF THE INVENTION

Most fork, lift and/or tow motor trucks are propelled by engines utilizing LPG (propane) as fuel, inasmuch as these engines emit considerably less objectionable exhaust emissions as opposed to the exhaust emissions from gasoline powered engines. However, when it is necessary to refuel an LPG powered truck the empty LPG motor fuel tank must be returned to the storage area and a full LPG tank must be taken from the storage area to the truck to be refueled. Even empty LPG tanks are heavy and full LPG tanks are considerably heavier than empty LPG tanks. Accordingly, a need exists for structure by which empty LPG tanks may be transported from trucks to be refueled to a storage area and full LPG motor fuel tanks may be transported back to the truck to be refueled.

Examples of various different forms of hand carts which could be used for transporting LPG motor fuel tanks for lift trucks, either full or empty, are disclosed in U.S. Pat. Nos. 2,078,119, 2,351,292 and 2,984,500. However, these previously known forms of hand carts are not constructed in a manner whereby they may be conveniently supported from an associated truck to be readily available for transporting an empty LPG tank back to a tank storage area, transporting a full LPG tank from the storage area to the truck to be refueled and then stored on the truck during its usage while the LPG within the tank on the truck is emptied of fuel as a result of operation of the truck. Accordingly, a need exists for an LPG tank cart which may be readily stored upon an LPG tank supported from a truck as a fuel supply therefor.

BRIEF DESCRIPTION OF THE INVENTION

The tank cart of the instant invention comprises a rigid cylindrical ring of a diameter for snugly receiving one of the diametrically reduced ends of a LPG tank therein with the shoulder of the tank defining the inner extremity of the diametrically reduced end abutted against the ring. A support leg is carried by a first peripheral portion of the ring and projects generally axially of one end thereof. A pair of support arms are also supported from second and third peripherally spaced portions of the ring substantially equally and oppositely angularly spaced from the support leg. The support arms are spaced slightly on the side of a diametric plane of the ring remote from the support leg and disposed normal to a radial plane containing the support leg. The arms also project generally axially outwardly of the aforementioned axial end of the ring and the outer free ends of the arms include support wheels journalled therefrom for rotation about generally aligned axes paralleling the aforementioned diametric plane. With the support wheels and the leg spaced on opposite sides of a diametric plane of the ring disposed normal to a radius of the ring containing the support leg, the ring of the cart may be supported on a floor surface while supporting the lower end of an LPG tank therefrom and with the bottom of the LPG tank spaced above the floor upon which the wheels and the leg of the cart rest. The top of the LPG tank includes a diametrically reduced protective cylindrical sleeve which protects the liquid LPG dispensing valve, volumetric gauge, bleeder valve, etc., and the sleeve includes peripherally spaced access openings therein, one of which openings may be used as a handle for support of the upper end of the tank when the cart is being used to transport the tank from one location to another. In this manner, the tank itself comprises an operating handle for the combination comprising the cart and the tank supported therefrom. Diametric and height dimensions of the cart are designed in conjunction with one another such that the cart comprises an LPG tank cart, and becomes self-storing on the associated LPG tank within the dimensionally confined area of the tank.

The main object of this invention is to provide a cart by which LPG tanks may be readily transported to and from a storage area.

Another object of this invention is to provide a cart including structural features thereof which enable the cart to be stored, when not in use, upon a tank mounted on an LPG powered truck.

Yet another object of this invention is to provide a cart constructed in a manner whereby it may be applied to either diametrically reduced end of an LPG tank and also secured on an LPG tank against falling therefrom when engaged with the upper end of the tank equipped with the valve protecting cylindrical sleeve thereof.

A unique object of this invention is to provide a means of mobilizing LPG motor fuel tanks for lift trucks by incorporating the tank itself as a part of the mobilizing invention; and in additiion, the tank becomes the mechanism for the cart to become self-storing. Thus, the invention becomes a specific device, a self-storing LPG tank cart.

A final object of this invention to be specifically enumerated herein is to provide a self-storing LPG tank cart in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
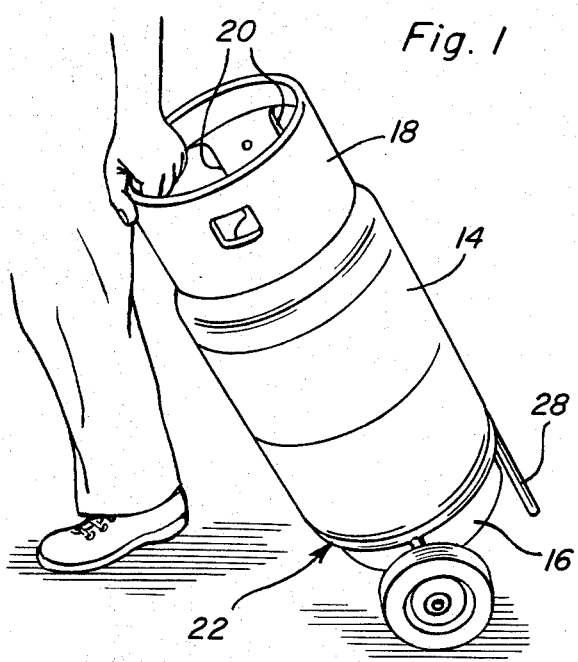
FIG. 1 is a perspective view of the tank cart in operation supporting an LPG tank from the lower end thereof and with the combination of cart and LPG tank being used to transport the tank from one location to another.

Referring now more specifically to the drawings the numeral 10 generally designates a conventional form of LPG powered truck having a support rack 12 mounted on the rear end thereof from which a conventional LPG tank 14 is removably supported.

The LPG tank 14 includes a diametrically reduced lower end 16 and a diametrically reduced valve protecting sleeve 18 at its upper end. The sleeve 18 includes peripherally spaced windows 20 formed therethrough.

The tank cart of the instant invention is referred to in general by the reference numeral 22 and includes a rigid cylindrical ring 24. A first peripheral portion 26 of the ring 24 includes an axially projecting support leg 28 and second and third peripheral portions 30 and 32 of the ring 24 equally oppositely spaced from the peripheral portion 26 support a pair of axially projecting support arms 34 and 36 therefrom. The leg 28 and arms 34 and 36 project outwardly from the same axial end of the ring 24 and the arms 34 and 36 comprise L-shaped arms including long legs 38 anchored to the ring 24 and terminating outwardly in free end short legs 40 oppositely outwardly directed from the outer ends of the long legs 38 and having support wheels 42 journalled thereon. The short legs 40 are substantially aligned and disposed on a chord plane of the ring 24 spaced on the side of a paralleling diametric plane of the ring 24 remote from the leg 28.

Figure 3:
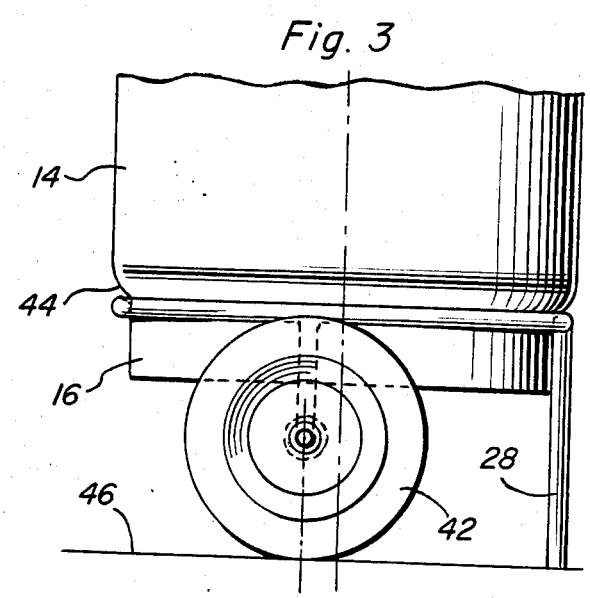
FIG. 3 is an enlarged side elevational view of the cart with the lower end of an LPG tank operatively associated therewith.
Figure 4:
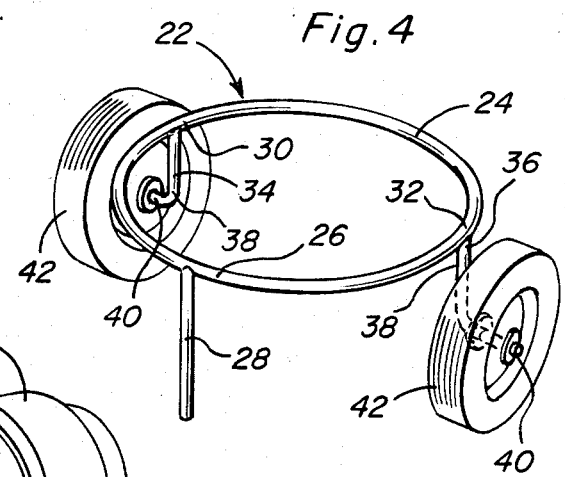
FIG. 4 is a perspective view of the tank cart.

The diametrically reduced lower end of the LPG tank 14 is snugly downwardly receivable within the ring 24 until the downwardly facing circumferential shoulder 44 of the tank 14 at the inner end of the diametrically reduced end 16 abuts the ring 24. In this position the lower terminal end of the tank 14 is spaced above the surface 46 upon which the wheels 42 and free end of the support leg 28 rest. It will be noted that when the cart 22 is supported from the surface 46 in the manner illustrated in FIG. 3, the tank 14 is supported in an upright position elevated above surface 46.

The outer surfaces of the diametrically reduced lower end portion 16 closely oppose the inner surfaces of the long legs 38 and support leg 28 thereby stabilizing the tank 14 relative to the ring 24 and the tank 14 may be tilted in the manner illustrated in FIG. 1 of the drawings and gripped through one of the windows 20 in order to trail the tank 14 and cart 22. Accordingly, the cart 22 provides a convenient manner in which the tank 14 may be either stationarily supported in an upright position or trailed from one location to another.

When the cart 22 has been used to trail a full tank 14 to the truck 10, the tank 14 is lifted from the cart 22 and clamped in position on the rack 12. Thereafter, the fuel line 50 of the truck 10 is coupled to the outlet valve of the tank 14 within the sleeve 18 through one of the windows 20 after the cart 22 has been applied over the sleeve 18. In this manner, the fuel line 50 will maintain the cart 22 in position on the valve protecting sleeve end of the tank 14. Therefore, the cart 22 becomes self-storing with tank 14 while the LPG powered truck 10 is in service.

Figure 2:
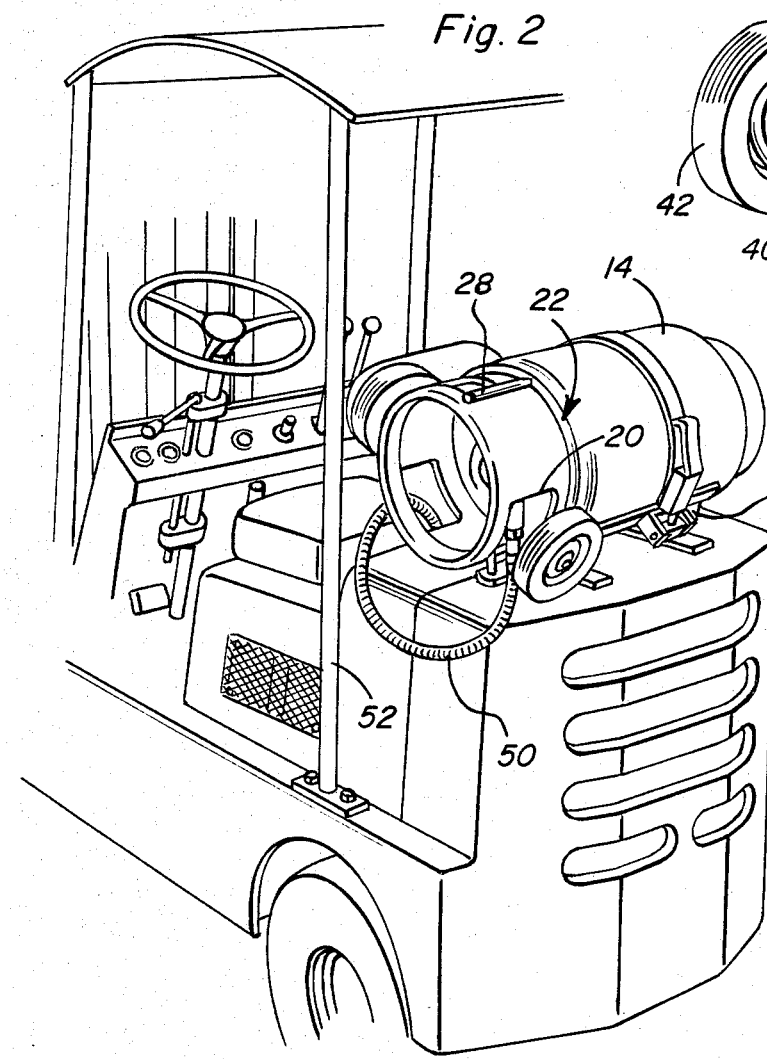
FIG. 2 is a perspective view of an LPG powered truck with the tank cart supported in stored position on an LPG tank mounted for service on the truck.

Further, most trucks such as the truck 10 include rear protective canopy support legs 52 which are sometimes spaced nearly equal to the opposite ends of an associated LPG tank. Therefore, the cart 22 is constructed in a manner whereby when it is stored, such as illustrated in FIG. 2 on the protective sleeve 18, the cart 22 includes no portions thereof which project outward of the free end of the sleeve 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An LPG tank including a shouldered diametrically reduced lower end, a cart for trailing said tank including a rigid cylindrical ring of an inside diameter snugly receiving said diametrically reduced end of said tank therethrough with the shoulder of said tank abutted against said ring, support leg means carried by a first peripheral portion of said ring and projecting generally axially of said ring away from said tank, a pair of support arms supported from second and third peripherally spaced portions of said ring substantially equally and oppositely angularly spaced from said first portion and spaced slightly on the side of a diametric plane of said ring remote from said first portion and disposed normal to a radial plane generally centered relative to said leg means, said arms also projecting generally axially outwardly from said ring away from said tank, the outer free ends of said arms including support wheels journalled therefrom for rotation about generally aligned axes paralleling said diametric plane, said axes being spaced outward of the free end of said diametrically reduced end of said tank, the upper end of said tank including a shoulder defining diametrically reduced protective sleeve of an axial extent greater than the axial extent of said diametrically reduced lower end and over which said ring of said cart is snugly receivable to a position with the shoulder defined by said sleeve abutted by said ring when said cart is inverted, the spacing between said ring and those peripheral portions of said wheels remote from said ring being less than the axial extent of said sleeve, whereby when said cart is positioned on said sleeve with said ring abutted against the shoulder defined by said sleeve, no portions of said cart, including the wheels thereof, project outward beyond the free end of said sleeve.

2. The cart of claim 1 wherein said arms comprise L-shaped arms including long legs anchored to said ring and free short legs oppositely outwardly directed from the outer ends of said long legs, said wheels being journalled on said short legs, the outer free end of said leg being spaced from said ring a distance slightly less than the peripheral portions of said wheels remote from said ring are spaced from the latter.

3. The tank cart of claim 2 wherein said ring comprises a ring of circular cross-sectional shape.

* * * * *